United States Patent [19]

Lewis

[11] Patent Number: 5,273,213

[45] Date of Patent: Dec. 28, 1993

[54] VARIABLE AREA NOZZLE FOR TURBOMACHINES

[75] Inventor: William J. Lewis, Somerset, England

[73] Assignee: Rolls-Royce Limited, London, England

[21] Appl. No.: 356,913

[22] Filed: Feb. 23, 1982

[30] Foreign Application Priority Data

Feb. 28, 1981 [GB] United Kingdom ............... 8106398

[51] Int. Cl.$^5$ .............................................. F02K 1/12
[52] U.S. Cl. .............................................. 239/265.39
[58] Field of Search ................... 60/228, 230, 232;
239/265.19, 265.33, 265.37, 265.39, 265.41

[56] References Cited

U.S. PATENT DOCUMENTS

| 2,831,321 | 4/1958 | Laucher | 239/265.39 |
| 2,984,068 | 5/1961 | Eatock | 239/265.39 |
| 3,612,400 | 10/1971 | Johnson et al. | 239/265.19 |
| 4,088,270 | 5/1978 | Maiden | 239/265.25 |
| 4,141,501 | 2/1979 | Nightingale | 239/265.39 |

FOREIGN PATENT DOCUMENTS

| 3019754 | 12/1981 | Fed. Rep. of Germany | 239/265.33 |
| 1367046 | 7/1963 | France . | |
| 947557 | 1/1964 | United Kingdom . | |
| 1278801 | 6/1972 | United Kingdom . | |

Primary Examiner—Stephen C. Bentley
Attorney, Agent, or Firm—Oliff & Berridge

[57] ABSTRACT

A variable area nozzle for a turbomachine comprising, a duct 25, an axially movable shroud 28 located at the downstream end of the duct 25, at least one circumferential array of plates 30 mounted at their upstream ends on the shroud, and an outer wall 34 surrounding the shroud 28 and the plates 30. The outer wall 34 extends downstream beyond the downstream end of the duct 25 and a plurality of links 36 which are pivotally attached to the outer wall 34 downstream of the downstream end of the duct 25 are provided. Each link 36 is pivotally attached to one of the plates 30. An actuator means 50 which is operable on the shroud 28 to move the shroud 28 along the duct 25 is provided. Axial movement of the shroud cause the plates 30 and the links 36 to pivot about the point of attachment of the links 36 to the outer wall 34 to vary the area of the nozzle. Further circumferential array of plates 37,39 may be provided downstream of the plates 30. The plates 37 are pivotally attached at their upstream ends to the downstream ends of plates 30.

8 Claims, 3 Drawing Sheets

VARIABLE AREA NOZZLE FOR TURBOMACHINES

DESCRIPTION

This invention relates to variable area nozzles for turbo-machines and is particularly, although not exclusively, concerned with nozzles that can be swivelled to vary the direction of thrust produced by the turbomachine.

Afterburning or reheat is a method of augmenting the basic thrust of a gas turbine engine and comprises the introduction and burning of additional fuel between the engine turbine and the jet pipe nozzle utilizing the unburnt oxygen in the exhaust gases to support the combustion.

Also, with engines such as the Rolls-Royce Limited's Pegasus engine in which cold by-pass air is discharged from vectorable "cold" nozzles, it is known to burn additional fuel in the air stream supplied to the nozzles to increase thrust. This is commonly referred to as plenum chamber burning (P.C.B.).

In both reheat and P.C.B. modes of operation, it is necessary to be able to increase the outlet area of the respective nozzle, to give an area suitable for the resultant increase in the volume of the gas stream to prevent any increase in pressure occurring that would otherwise affect the efficient functioning of the engine. The actual area of the nozzle is dictated by many factors which affect the mass flow of air through the engine, such as for example, altitude, ambient temperature, forward speed of the aircraft, and speed of the engine.

With nozzles that are swivellable, the mechanism for varying the area of the outlet must be simple to operate, capable of being operated independently of the mechanism for swivelling the nozzle, robust, and lightweight so as not to impose unacceptable loads on the mechanism for supporting and swivelling the nozzle.

The invention as claimed provides a variable area nozzle for a turbomachine, which is simple to operate, robust and lightweight. The nozzle is also suited for use as a swivellable nozzle.

The invention will now be described by way of examples with reference to the accompanying drawings in which.

Figure 1:
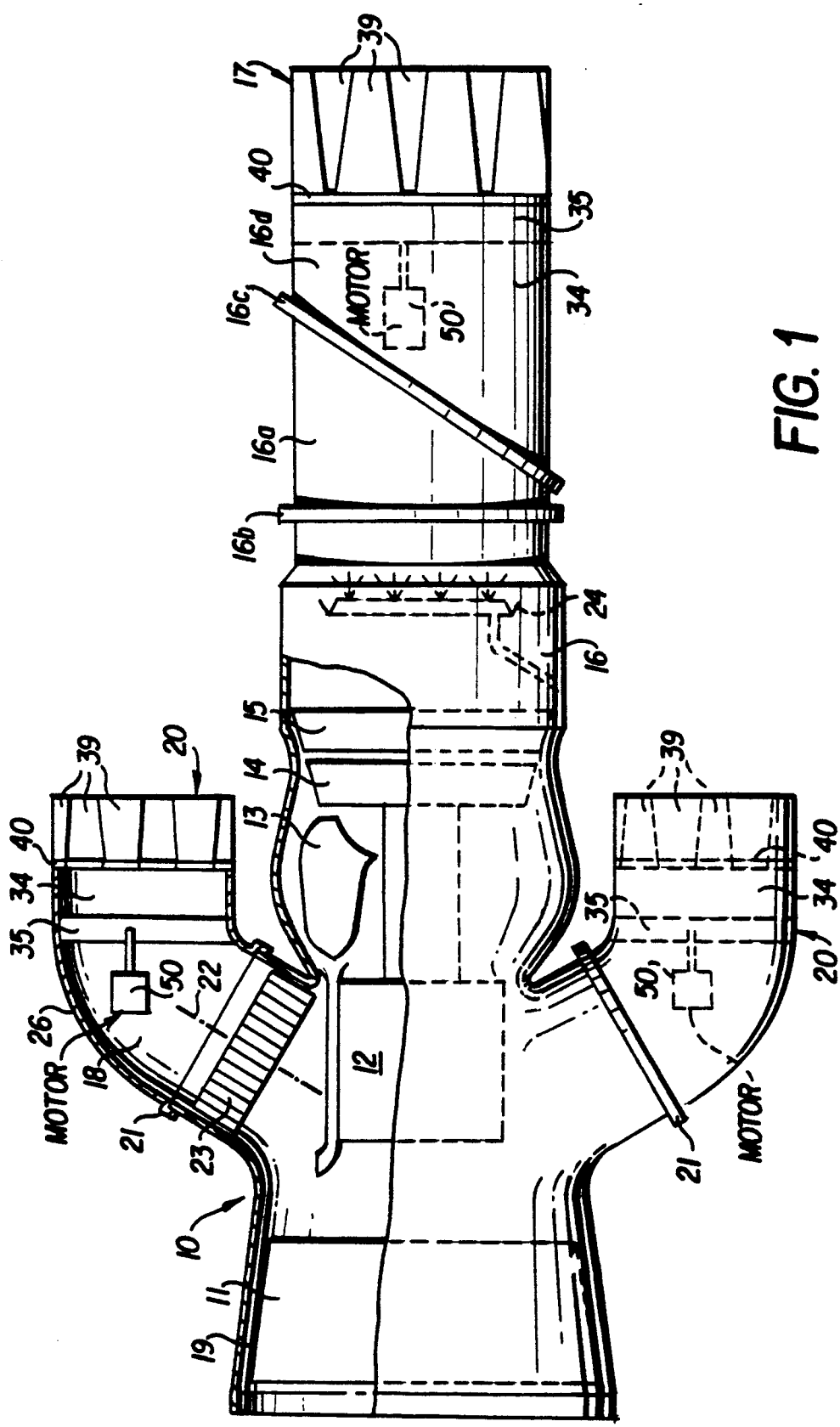
FIG. 1 illustrates schematically a gas turbine engine fitted with three vectorable variable area nozzles constructed according to the present invention.

Referring to FIG. 1 there is shown schematically a gas turbine aero engine 10 of the by-pass type, incorporating three vectorable nozzles. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 21 for rotation through an angle of approximately 110° about an axis 22.

Additional combustion equipment 23 is provided in the plenum chamber 18 so that additional fuel can be burnt in the air stream ejected-through the nozzles 20 to increase the thrust. To enable the engine to run efficiently the nozzles 20 are provided with variable area outlets and are constructed in accordance with the present invention. The area of the nozzles 20 can be selectively varied from a maximum area for supersonic flight with the additional combustion equipment 23 ignited (P.C.B.), to a minimum area for subsonic flight without P.C.B. (dry-mode).

Similarly the jet pipe 16 is provided with a re-heat system 24 and a variable area nozzle 17 constructed in accordance-with the present invention. The jet pipe 16 terminates in what is commonly called a scarfed nozzle. That is to say the rear end of the jet pipe 16 comprises a first section 16a which is mounted in bearings 16b for rotation about the longitudinal axis of the jet pipe 16. The rear end of the first section 16a is scarfed, that is to say lies at an angle to the longitudinal axis and has a bearing 16c for supporting a second complementary scarfed section 16d of the jet pipe 16. By rotating the first section 16a about the longitudinal axis of the jet pipe 16 and simultaneously rotating the second section 16d in the plane of the scarfed joint relative to the first section 16a the nozzle can be swivelled from a direction pointing rearwards to a position pointing downwards.

The outlet area of the nozzle 17 can be varied from a maximum with the reheat system 24 ignited to a minimum area without the reheat system 24 ignited.

For convenience only one of the nozzles 20, will be described in greater detail, but it is to be understood that the variable area mechanism of the nozzle 17 is similar to that of the nozzles 20 except for the actual areas defined at the outlets.

The nozzle 20 comprises a duct 25 mounted for rotation in bearings 21. The duct comprises a fixed portion 26 which blends from a right-circular cross-section at the plane of the bearing 21 to a substantially circular shaped cross-section in the plane of the nozzle outlet.

Located at the downstream end of the duct 25 is an axially translatable shroud 28, to the downstream edge of which is pivotally attached a plurality of flat overlapping plates 30. The shroud 28 is driven in the direction of arrows A by means of one or more air motors 50 which drive one or more screw jacks 43. Preferably leakage of gases between the duct 25 and the shroud 28 is reduced by the provision of an air seal 31.

Figure 3:
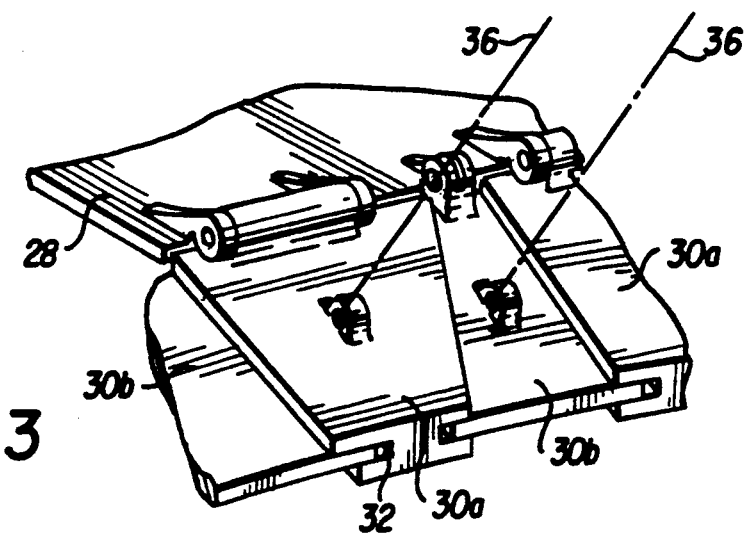

To accommodate the variation of surface area defined by the plates 30 as they pivot, the plates 30 overlap each and are generally of trapezoidal shape. Alternate plates 30(a) have their narrowest end downstream and the remainder 30(b) have their narrowest end upstream (as shown in FIG. 3). The plates 30(a) are provided with recesses 32 to accommodate the plates 30(b) and form a reasonable air seal.

Around the outside of the shroud 28 there is provided a fixed outerwall 34 connected to the duct 25 by means of a front bulkhead 35. The outerwall 34 extends downstream of the end of the duct 25. A plurality of links 36 are pivotally attached at one of their ends to the outerwall 34 at a region downstream of the end of the duct 25 and each is pivotally attached at its other end to one of the plates 30 at a region intermediate the upstream and downstream ends of the panel 30.

Figure 2:
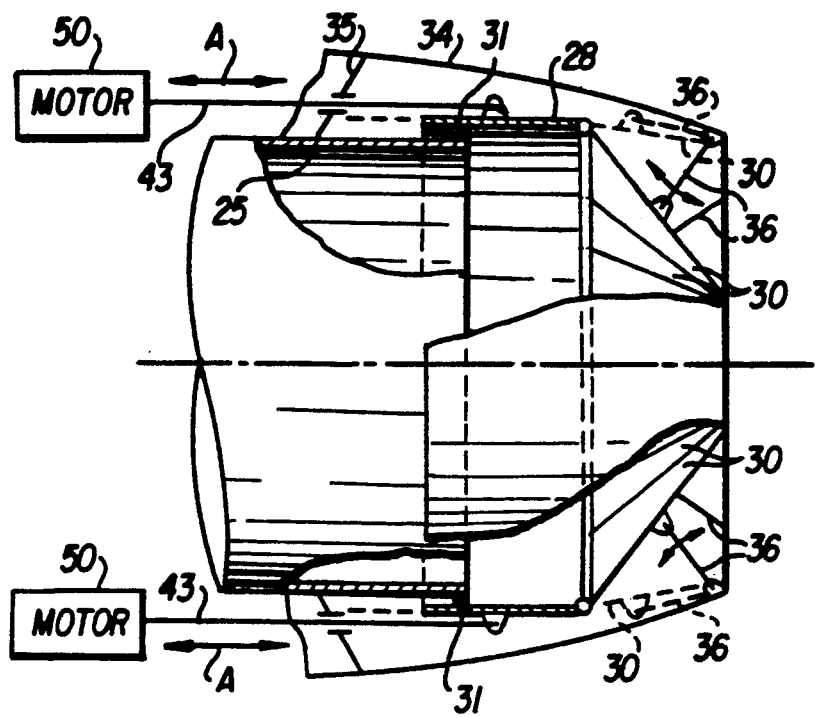
FIGS. 2 and 3 illustrate in more detail a cross sectional view of one of the nozzles of the engine of FIG. 1.

In operation the minimum area is defined with the shroud 28 moved to its furtherest extent of travel in a downstream direction as shown in FIG. 2. In this position the plates 30 define a convergent nozzle. Maximum area is obtained with the shroud 28 moved to its furthest extent of travel in the upstream direction (as shown dottes in FIG. 2) and the plates 30 then lie almost parallel to the longitudinal axis of the duct.

Figure 4:
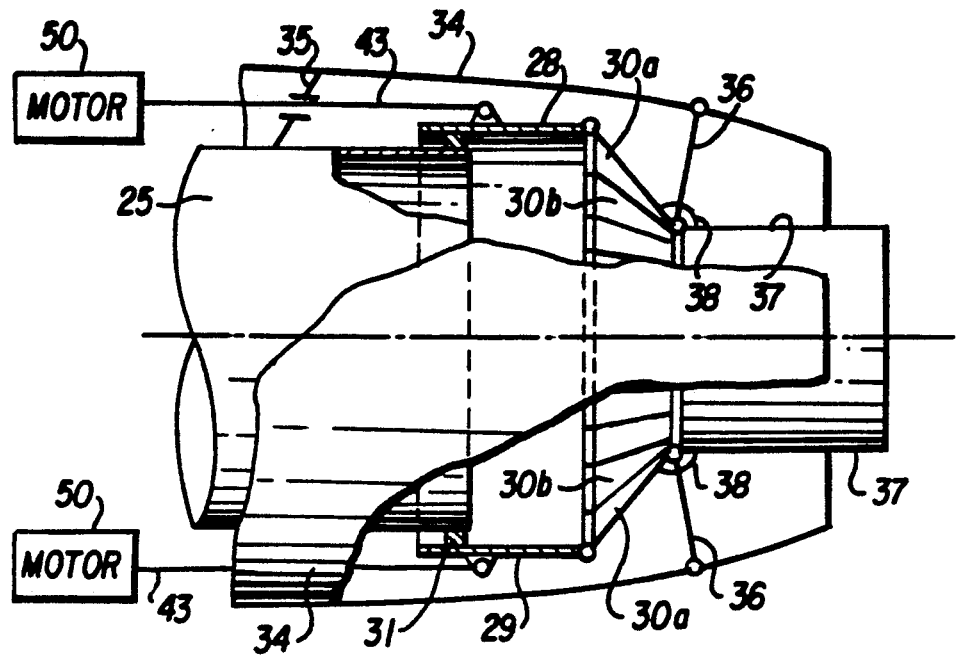
FIGS. 4 and 5 are schematic cross-sectional views of alternative nozzles to that shown in FIGS. 1 and 2, constructed in accordance with the present invention.

Referring now to FIG. 4 there is shown an alternative nozzle to that shown in FIGS. 2 and 3. The nozzle comprises a duct 25, an axially translatable shroud 28, an outerwall 34, links 36 and a first set of plates 30 as described above. However, the links 36 are pivotally connected to the downstream edge of the plates 30 and a second set of overlapping plates 37 are pivotally mounted at their upstream ends on the downstream end of the plates 30. Here again the plates 37, like the plates 30, are of trapezoidal shape and alternate plates 37 are arranged with their narrowest edge downstream whereas the remainder are arranged with their narrowest edge upstream. Alternate plates 37 are recessed to accommodate adjacent plates similar to that shown in FIG. 3.

A stop 38 is provided on each plate 30 to limit the minimum angle which the panels 37 assume relative to the plates 30. In addition, the outer wall 34 is continued downstream of the pivotal attachment of the links 36 to the outerwall 34 to provide an edge against which the plates 37 are urged. In operation, the maximum area is defined by pulling the shroud 28 forwards and the plates 37 engage the outer wall 34. By moving the shroud 28 in a downstream direction the links 36 pivot and move the plates 30 and 37 to positions where they define a convergent-divergent nozzle. In this position, the plates 37 are urged outwardly by the pressure within the nozzle to engage the outerwall 34. Further movement of the shroud 28 in the downstream direction causes the stop 38 to lift the plates 37 off the outerwall to define a convergent nozzle.

Figure 5:
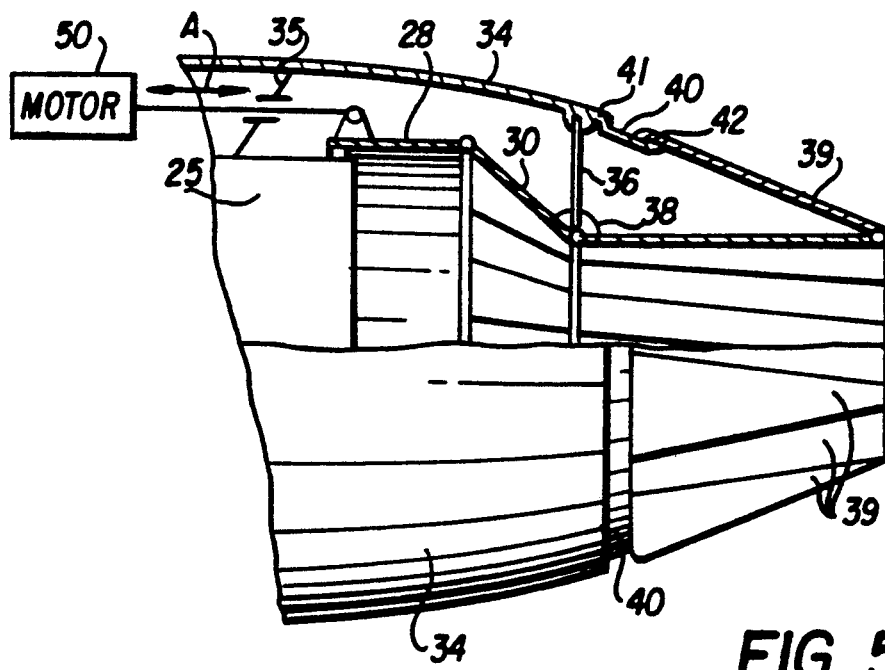

If desired an outer plate 39 may be provided between the downstream end of the outerwall 34 and the otherwise free end of the plates 37 as shown in FIG. 5. The plates 39 are slidable relative to the outer wall 34 in guideways 40 and stops 41,42 are provided to limit the extent of movement. In operation of the nozzle of FIG. 5, moving the shroud 28 axially in the direction of arrows A causes the plates 30 and 37 to vary the area of the nozzle.

I claim:

1. A variable area nozzle for a turbomachine comprising:
   a duct;
   an axially movable shroud located at the downstream end of the duct;
   at least one circumferential array of first plates pivotally mounted a their upstream ends on the shroud;
   an outer wall surrounding the shroud and the plates and extending beyond said downstream end of the duct; and
   actuator means for moving the shroud along the duct, thereby to cause the plates and the links to pivot and vary the area of the nozzle.

2. A nozzle according to claim 1 wherein the links are attached to the plates at a region intermediate the upstream and downstream edges of the plates.

3. A nozzle according to claim 1 further comprising a plurality of second plates each of which is pivotally attached at its upstream end to the downstream end of one of the first plates.

4. A nozzle according to claim 3 further comprising means for restricting the amount of pivotal movement of each second plate relative to the first plates.

5. A nozzle according to claim 3 wherein each of the links is pivotally attached to a first plate at a region adjacent the pivotal attachment of the second plate to the first plate.

6. A nozzle according to claim 5 further comprising a plurality of movable outer plates, each outer plate extending between the outer wall and the downstream end of a second plate to provide a continuation of the outer wall, the outer plate being constrained to move substantially axially relative to the outer wall.

7. A nozzle according to claim 1 further comprising a seal between the shroud and the downstream end of the duct.

8. A nozzle according to claim 1 wherein the duct further comprising the downstream end of a vectorable nozzle of a gas turbine engine.

* * * * *